US011334397B2

(12) United States Patent
Kottapalli et al.

(10) Patent No.: US 11,334,397 B2
(45) Date of Patent: May 17, 2022

(54) APPLICATION DEMAND-BASED MIGRATION OF VIRTUAL MACHINES IN LOGICAL CLUSTERS

(71) Applicant: VMware, Inc., Palo Alto, CA (US)

(72) Inventors: Ravi Kumar Reddy Kottapalli, Bangalore (IN); Srinivas Sampatkumar Hemige, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 226 days.

(21) Appl. No.: 16/563,983

(22) Filed: Sep. 9, 2019

(65) Prior Publication Data

US 2021/0026678 A1    Jan. 28, 2021

(30) Foreign Application Priority Data

Jul. 22, 2019  (IN) .............................. 201941029477

(51) Int. Cl.
*G06F 9/50* (2006.01)
*G06F 9/455* (2018.01)
*G06N 20/00* (2019.01)

(52) U.S. Cl.
CPC ........ *G06F 9/5083* (2013.01); *G06F 9/45558* (2013.01); *G06N 20/00* (2019.01); *G06F 2009/4557* (2013.01)

(58) Field of Classification Search
CPC .................... G06F 9/45558; G06F 2009/4557
See application file for complete search history.

(56) References Cited

U.S. PATENT DOCUMENTS

| 8,843,933 B1* | 9/2014 | Holler ................. G06F 9/45533 |
| | | 718/104 |
| 10,067,803 B2* | 9/2018 | Cropper ................ G06F 9/5083 |
| 10,389,586 B2* | 8/2019 | Hockett ............. H04L 41/5041 |
| 10,826,812 B2* | 11/2020 | Casacio ............. G06F 11/2048 |
| 2016/0306675 A1* | 10/2016 | Wiggers ................ G06F 9/4856 |
| 2017/0364391 A1* | 12/2017 | Poghosyan ............. G06F 9/505 |
| 2018/0062929 A1* | 3/2018 | Maskalik ............ H04L 41/0886 |
| 2020/0252463 A1* | 8/2020 | Klaghofer ............. G06F 9/5072 |

* cited by examiner

*Primary Examiner* — Jacob D Dascomb

(57) ABSTRACT

Techniques for migrating virtual machines in logical clusters based on demand for the applications are disclosed. In one example, a system may include a logical cluster that spans across a first datacenter located at a first site and a second datacenter located at a second site, the second datacenter being a replication of the first datacenter. The first datacenter may include a virtual machine executing an application. Further, the system may include a management node communicatively coupled to the first datacenter and the second datacenter. The management node may include a dynamic affinity policy engine to monitor the application running in the first datacenter, determine a demand for the application from the first datacenter and the second datacenter based on the monitoring, and recommend migration of the virtual machine hosting the application from the first datacenter to the second datacenter based on the demand for the application.

17 Claims, 7 Drawing Sheets

| APPLICATION RUNNING IN SITE 404 | APPLICATION 402 | | | | |
|---|---|---|---|---|---|
| | LOCAL COUNT 406 | REMOTE COUNT 408 | DIFFERENCE 410 | VMOTION 412 | APPLICATION POSITION 414 |
| SITE A | 1000 | 500 | 500 | FALSE | SITE A |
| SITE A | 500 | 1000 | 500 | TRUE | SITE B |
| SITE B | 600 | 1000 | 400 | TRUE | SITE A |
| SITE A | 600 | 300 | 300 | FALSE | SITE A |
| SITE A | 600 | 1000 | 400 | TRUE | SITE B |

APPLICATION DEMAND-BASED MIGRATION OF VIRTUAL MACHINES IN LOGICAL CLUSTERS

RELATED APPLICATIONS

Benefit is claimed under 35 U.S.C. 119(a)-(d) to Foreign Application Serial No. 201941029477 filed in India entitled "APPLICATION DEMAND-BASED MIGRATION OF VIRTUAL MACHINES IN LOGICAL CLUSTERS", on Jul. 22, 2019, by VMWARE, INC., which is herein incorporated in its entirety by reference for all purposes.

TECHNICAL FIELD

The present disclosure relates to computing environments, and more particularly to methods, techniques, and systems for migrating virtual machines between datacenters in a logical cluster based on a demand for applications.

BACKGROUND

Databases rely on data replication and synchronization to maintain continuous system availability (also referred as high availability). In such a system, a complete copy of the database may be stored at a first datacenter and the same complete copy of the database may be stored at a second datacenter. Further, the high availability may be applied to logical cluster including a number of datacenters that span across different sites. When there is a failure associated with one datacenter, the system can switch to use another datacenter without sustaining an outage.

BRIEF DESCRIPTION OF THE DRAWINGS

FIG. 4 shows an example application table corresponding to an application;

Figure 1:
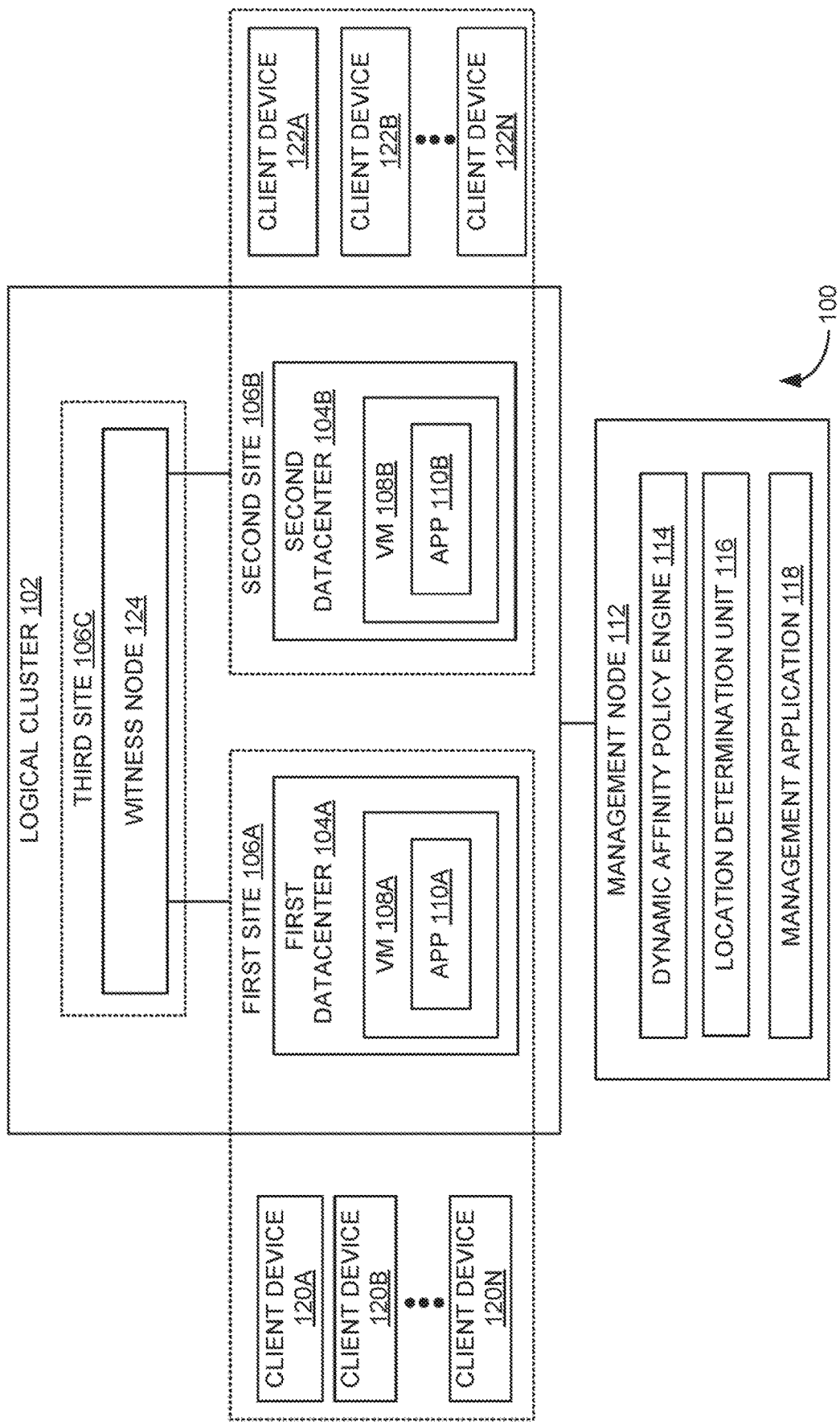
FIG. 1 is a block diagram of an example system illustrating a management node to recommend migration of a virtual machine hosting an application from a first datacenter to a second datacenter based on a demand for the application.

The drawings described herein are for illustration purposes only and are not intended to limit the scope of the present subject matter in any way.

DETAILED DESCRIPTION

Embodiments described herein may provide an enhanced computer-based and network-based method, technique, and system for recommending migration of virtual machines between datacenters in a logical cluster based on demand for applications. Example logical cluster may be a stretched cluster such as a virtual storage area network (vSAN) stretched cluster. The stretched clusters may extend the vSAN cluster from a single data site to two data sites for a higher level of availability and intersite load balancing. In the stretched clusters, both sites can be configured as active sites. If either site fails, vSAN uses the storage on the other site to restart any effected virtual machines.

A stretched cluster may include two data sites (e.g., a preferred site and a secondary site) and one witness host. The witness host may reside at a third site and contain the witness components of virtual machine objects. The witness host may serve as a tiebreaker when a decision must be made regarding availability of datastore components when the network connection between the two sites is lost. In this case, the witness host may form a cluster with the preferred site. But if the preferred site becomes isolated from the secondary site and the witness host, the witness host may form a cluster using the secondary site. When the preferred site is restored, data is resynchronized to ensure that both sites have the latest copies of data.

Consider that the stretched cluster is spanned across a first datacenter and a second datacenter located at a first site and a second site, respectively. The first site and the second site may be located at two different geographical locations. In stretched cluster, each site can be configured as a fault domain. A virtual machine deployed on the stretched cluster can have one copy of its data on the first site, a second copy of its data on the second site, and any witness components placed on the witness host in a third site. This configuration may be achieved through fault domains alongside hosts and virtual machine groups, and affinity rules. In the event of a complete site failure, there can be a full copy of the virtual machine data on another site and the virtual machine can be restarted on the other site.

In this example, consider that the first site may be configured as a preferred site for an application and the second site may be configured as a secondary site for the application. The application may be hosted in the first datacenter of the preferred site. During operation, users from both the sites may consume the application that is hosted in the first datacenter. Consider that the users at the first site consuming the application running in the first datacenter as "local users" and users at the second site consuming the application running in the first datacenter as "remote users". In some examples, the remote users may connect to the first site from the second site via private or public network based on the infrastructure implementation to access the application offered by the first datacenter.

In this scenario, a number of users (i.e., the local users and the remote users) from both the first site and second site may access the application running in the first site. However, there may be a chance that the number of remote users accessing the application may increase over a period. In such a situation, running the application in the first site may not be recommended when the number of remote users accessing the application is greater than the number of local users accessing the application, which can effect parameters such as wide area network (WAN) bandwidth usage, application performance aspects, and the like. Thus, assigning applications tied to the preferred site statically may not be a flexible and scalable method in terms of application performance and may lead to congestion of the public or private link bandwidth.

Examples described herein may migrate virtual machines between datacenters based on a demand for the applications. Examples described herein may identify a density of application users in the vSAN stretched clusters and dynamically generate a rule (e.g., an affinity rule) that may ensure dynamic application mobility to position the applications close to end users to provide better application performance and optimal usage of public or private link bandwidths.

In one example, an application running in a first datacenter of a logical cluster may be monitored. Example logical cluster may span across the first datacenter and a second datacenter. Further, a demand for the application may be determined from the first datacenter and the second datacenter based on the monitoring. Furthermore, a virtual machine hosting the application may be migrated from the first datacenter to the second datacenter based on the demand for the application.

System Overview and Examples of Operation

FIG. 1 is a block diagram of an example system 100 illustrating a management node 112 to recommend migration of a virtual machine (e.g., 108A) hosting an application (e.g., 110A) from a first datacenter 104A to a second datacenter 104B based on a demand for application 110A. As shown in FIG. 1, system 100 may include a logical cluster 102. Example logical duster 102 may be a stretched cluster (e.g., a SAN stretched cluster).

In one example, logical duster 102 may include first datacenter 104A located at a first site 106A. First datacenter 104A may include virtual machine 108A executing application 110A. Further, logical cluster 102 may include second datacenter 104B located at a second site 106B. Example second datacenter 104B may be a replication of first datacenter 104A. Furthermore, a data virtualization communications connection may be established between first datacenter 104A and second datacenter 104B. In this example, first site 106A may be configured as a preferred site for application 110A and second site 106B may be configured as a secondary site for application 110A. Hence, application al 110B executing in a virtual machine 108B of second site 106B may be a copy or replication of application 110A.

Further, logical cluster 102 may include a witness node 124 located at a third site 106C. Witness node 124 may be connected to first datacenter 104A and second datacenter 104B. In one example, witness node 124 may serve as a tiebreaker for a split-brain scenario and store witness components associated with application 110A.

Furthermore, system 100 may include management node 112 communicatively coupled to first datacenter 104A and second datacenter 104B. In one example, management node 112 may include a dynamic affinity policy engine 114, a location determination unit 116, and a management application 118 communicatively coupled to each other. In one example, management application 118 may reside in management node 112 or may be part of another computing system corresponding to another site.

During operation, dynamic affinity policy engine 114 ma monitor application 110A running in virtual machine 108A of first datacenter 104A. Further, dynamic affinity policy engine 114 may determine a demand for application 110A from first datacenter 104A and second datacenter 104B based on the monitoring. Furthermore, dynamic affinity policy engine 114 may recommend migration of virtual machine 108A hosting application 110A from first datacenter 104A to second datacenter 104B based on the demand for application 110A.

In one example, dynamic affinity policy engine 114 may dynamically generate an affinity rule based on the demand for application 110A from first datacenter 104A and second datacenter 104B. Further, dynamic affinity policy engine 114 may transmit the affinity rule to management application 118. Further, management application 118 may apply the affinity rule to migrate virtual machine 108A hosting application 110A from first datacenter 104A to second datacenter 104B. Thus, an application 110B running in virtual machine 108B in second datacenter 104B may become active and the users can consume application 110B running in virtual machine 108B of second datacenter 104B.

In one example, dynamic affinity policy engine 114 may determine the demand for application by determining a first number of users (e.g., associated with client devices 120A-120N) accessing application 110A from first site 106A of first datacenter 104A and determining a second number of users (e.g., associated with client devices 122A-122N) accessing application 110A from second site 106B of second datacenter 104B. In one example, location determination unit 116 of dynamic affinity policy engine 114 may determine that the first number of users and the second number of users are accessing application 110A from first site 106A and second site 106B, respectively.

Further, dynamic affinity policy engine 114 may determine that the second number of users may be greater than the first number of users by an application preferred threshold. In one example, the application preferred threshold may be set for application 110A by an administrator. In another example, the application preferred threshold may be dynamically determined for application 110A using a machine learning algorithm. Furthermore, dynamic affinity policy engine 114 may dynamically generate an affinity rule when the second number of users is greater than the first number of users by the application preferred threshold. In one example, dynamic affinity policy engine 114 may recommend migrating virtual machine 108A hosting application 110A from first datacenter 104A to second datacenter 104B via transmitting the affinity rule to management application 118.

In one example, dynamic affinity policy engine 114 may maintain and dynamically update an application table to include the first number of users accessing application 110A from first site 106A, the second number of users accessing application 110A from second site 106B, and the affinity rule. The application table may be used to migrate the virtual machine in real time based on the affinity rule.

In some examples, the functionalities described herein, in relation to instructions to implement functions of dynamic affinity policy engine 114, location determination unit 116, management application 118, and any additional instructions described herein in relation to the storage medium, may be implemented as engines or modules including any combination of hardware and programming to implement the functionalities of the modules or engines described herein. The functions of dynamic affinity policy engine 114, location determination unit 116, and management application 118 may also be implemented by a respective processor. In examples described herein, the processor may include, for example, one processor or multiple processors included in a single device or distributed across multiple devices. Further, management node 112 can be a service process in the management application or can be an appliance running in the datacenter to cater multiple management applications in a cloud-based environment. For example, dynamic affinity policy engine 114 and location determination unit 116 may be implemented in VMware Cloud Foundation (VCF) software-defined datacenter (SDDC) Manager. Example management application 118 may be a part of vCenter Server™ and vSphere® program products, which are commercially available from VMware.

Figure 2:
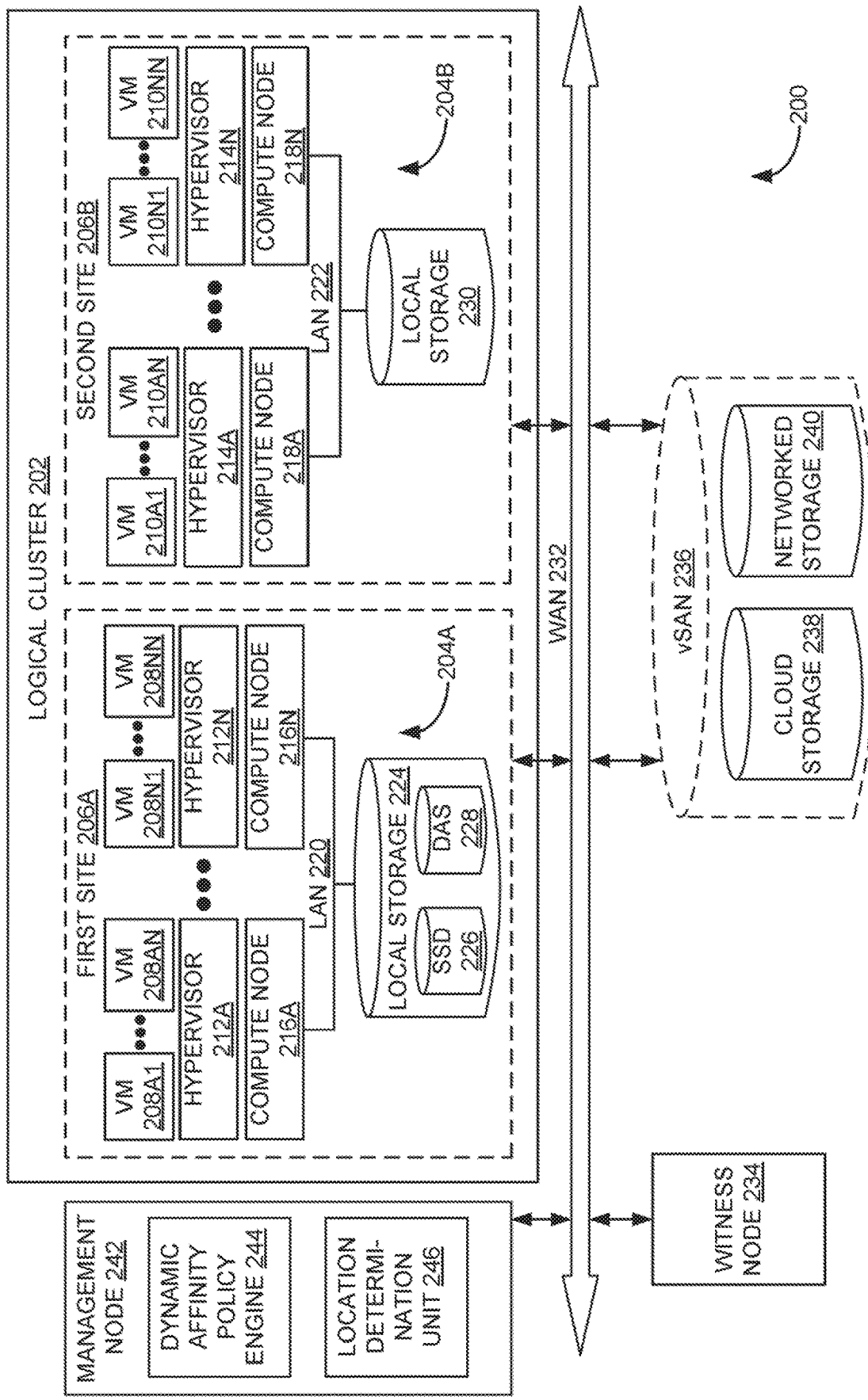
FIG. 2 is a block diagram of another example system illustrating a management node to recommend migration of a virtual machine hosting an application from a first datacenter to a second datacenter in a logical cluster.

FIG. 2 is a block diagram of another example system 200 illustrating a management node 242 to recommend migration of a virtual machine hosting an application from a first datacenter 204A to a second datacenter 204B in a logical cluster 202. As shown in FIG. 2, system 200 may include logical cluster 202, which may be a vSAN stretched cluster (e.g., a hyperconverged infrastructure (HCI)). Example HCI may combine storage, compute, and networking into a single system. For example, the vSAN stretched cluster may include first datacenter 204A located at a first site 206A that may be configured as a first fault domain and second datacenter 204B located at a second site 206B that may be configured as a second fault domain. Thus, logical cluster 202 may extend the vSAN cluster from a single data site to multiple sites for a higher level of availability and inter-site load balancing. Example logical cluster 202 may be a stretched cluster, a multi-AZ cluster, a metro cluster, or a high availability (HA) cluster that crosses multiple areas within local area networks (LANs) 220 and 222, the WAN 232, or the like.

In some examples, vSAN stretched cluster or logical cluster 202 may provide resiliency against the loss of a site. For example, when first site 206A goes offline unexpectedly, virtual machines running in the first site affected by the outage may be automatically restarted at second site 206B with no data loss. Also, vSAN stretched clusters may be beneficial in planned downtime and disaster avoidance situations. In one example, with logical cluster 202, virtual machines at first site 206A can be migrated to second site 206B, for instance, via VMware vMotion. Further, logical cluster 202 may be based on fault domains. For example, instead of creating a fault domain per rack, complete sites or datacenters may be considered to be a fault domain, which may allow an administrator to configure a vSAN object across two separate geographical sites 206A and 206B.

As shown in FIG. 2, logical cluster 202 may include two or more sites (e.g., first site 206A and second site 206B). Further, each site (e.g., first site 206A and second site 206B) may include multiple compute nodes (e.g., 216A-216N corresponding to first site 206A and 218A-218N corresponding to second site 206B). Example compute nodes may be physical computing devices. Further, one or more virtual machines (e.g., 208A1-208AN, 208N1-208NN, 210A1-210AN, and 210N1-210NN), in some examples, may operate on each of compute nodes (e.g., 216A-216N and 218A-218N) via respective hypervisors (e.g., 212A-212N, and 214A-214N). The virtual machines, in some embodiments, may operate with their own guest operating systems on the physical computing devices using resources of the physical computing device virtualized by virtualization software (e.g., hypervisors, virtual machine monitors, and the like).

Further, system 200 may include a witness node 234. In one example, witness node 234 may conduct cluster quorum-type services in the event of a failure. Further, witness node 234 may be a virtual machine appliance running an enterprise-class, type-1 hypervisor (ESXi) that may be configured specifically for use with logical cluster 202. For example, witness node 234 may enable logical cluster 202 to achieve quorum when one of the two sites (e.g., first site 206A and second site 206B) is offline and may act as a tiebreaker. In some examples, witness node 234 may not store virtual machine data such as virtual disks. Further, witness node 234 may contain metadata and may not participate in storage operations.

In one example, each host (e.g., compute nodes (e.g., 216A-216N and 218A-218N) may be an implicit fault domain. Further, logical cluster 202 may use this feature or configuration in order to implement examples described herein. Example fault domain may refer to a group of servers, storage, and/or networking components. In the case of vSAN stretched clusters, vSAN may collect the hosts in each site into a single entity called "fault domain" and the decisions are made based on that fault domain as one unit.

For example, logical cluster 202 may include three fault domains (e.g., a preferred site 206A, a secondary site 206B, and witness node 234). Each fault domain may represent a separate site. Preferred site 206A may be a preferred region to run applications. Further, the applications hosted in preferred site 206A may be considered as active. Secondary site 206B may be considered as failover option for the applications hosted in preferred site 206A. For example, whenever some disaster or planned upgrades happens in preferred site 206A, then the virtual machines running the applications in preferred site 206A may be moved to secondary site 206B and secondary site 206B may take in charge of running the applications. Whenever preferred site 206A restores back, the virtual machines running applications in secondary site 206B may be moved back to preferred site 206A again and may offer the applications from preferred site 206A.

As shown in FIG. 2, system 200 may include management node 242 communicatively coupled to first datacenter 204A at first site 206A and second datacenter 204B at second site 206B. In one example, management node 242 may include a dynamic affinity policy engine 244 to monitor an application running in a virtual machine 208A1 of first datacenter 204A. Further, dynamic affinity policy engine 244 may determine a demand for an application from first datacenter 204A and second datacenter 204B based on the monitoring using a location determination unit 246 as described in FIG. 1. Furthermore, dynamic affinity policy engine 244 may recommend migration of virtual machine 208A1 hosting the application from first datacenter 204A to second datacenter 204B based on the demand for the application. The functions of dynamic affinity policy engine 244 may be similar to functions described with respect to dynamic affinity policy engine 114 of FIG. 1.

As shown in FIG. 2, system 200 may include a local storage 224 that may be communicatively coupled to compute nodes 216A-216N via LAN 220. Local storage 224 may include a solid-state drive (SSD) 226 and a direct access storage (DAS) 228. Further, local storage 224 may also include a persistent memory (PMem) disk. Similarly, system 200 includes a local storage 230 coupled to compute nodes 218A-218N via LAN 222. Furthermore, vSAN storage 236 may include a cloud storage 238 and a networked storage 240.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Figure 3:
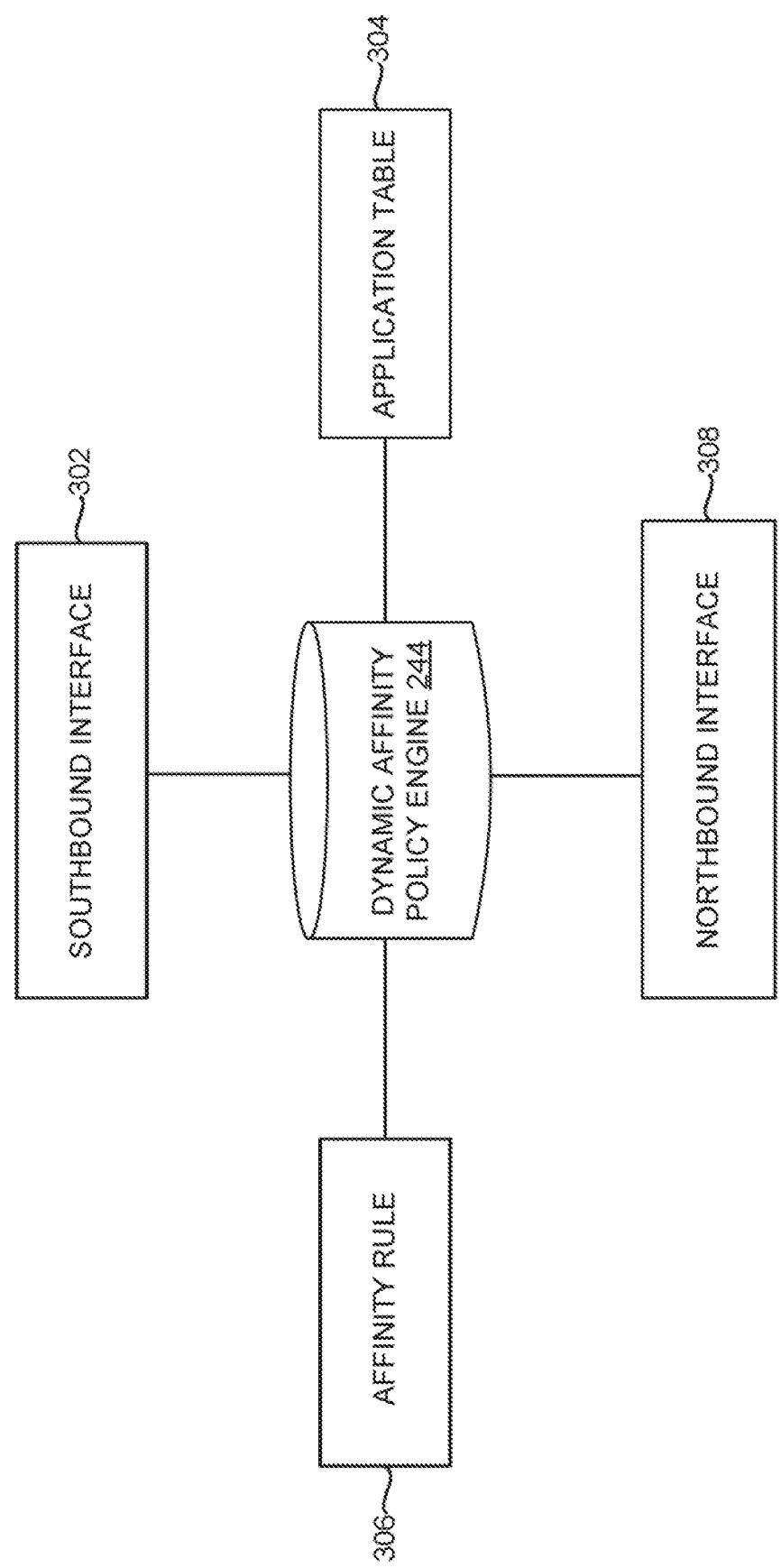
FIG. 3 is a schematic diagram illustrating functionalities of an example dynamic affinity policy engine of FIG. 2.

FIG. 3 is a schematic diagram illustrating functionalities of an example dynamic affinity policy engine 244, such as the one shown in FIG. 2. At 302, dynamic affinity policy engine 244 may facilitate a southbound interface. In one example, the southbound interface may provide an option to an administrator to define an application preferred threshold for each application that may require application high availability (HA). In another example, the application preferred threshold may be dynamically determined for the application using a machine learning algorithm. In this example, the southbound interface may be an interface to an analytic platform to dynamically determine the application preferred threshold.

At 304, dynamic affinity policy engine 244 may maintain and dynamically update an application table, which may be used to compare the application preferred threshold with respect to a differentiated count of a number of users accessing an application from different sites. For example, dynamic affinity policy engine 244 may include a first number of users accessing the application from a first site, a second number of users accessing the application from a second site, and the differentiated count between the first number of users and the second number of users. Example application table may be depicted in FIG. 4.

In one example, the application table may be dynamic in nature and may be maintained by an SDDC manager. Further, the SDDC manager may in turn has integration with modules such as, but not limited to a global positioning system (GPS) and geolocation identifier software, that may determine locations of the users in order to identify user as a remote user or a local user for a particular site.

At 306, dynamic affinity policy engine 244 may dynamically generate an affinity rule based on the differentiated count and the application preferred threshold. Further, the affinity rule may be applied to the vSAN stretched cluster through a management application, such as VMware vCenter™, for instance.

At 308, dynamic affinity policy engine 244 may facilitate a northbound interface. In one example, the northbound interface may interface with the sites or datacenters to push or configure the dynamically generated affinity rules in the vSAN stretched cluster through the management application. Thus, dynamic affinity policy engine 244 may dynamically generate the affinity rule and may be pushed to the end points (e.g., sites) with the northbound interface and may make sure rules are effective and dynamic with conditions.

FIG. 4 shows an example application table 400 corresponding to an application 402. In one example, application table 400 may include different columns such as an application running in site 404, a local count 406, a remote count 408, a difference 410, VMotion 412, and an application position 414. Application running in site 404 may depict a site in which application 402 is currently executed. Local count 406 may depict a number of users (i.e., local users) accessing application 402 from the site at which application 402 is currently executed. Remote count 408 may depict a number of users (i.e., remote users) accessing application 402 from another site. Difference 410 may depict a difference between local count 406 and remote count 408. VMotion 412 may depict whether a virtual machine executing application 402 has to be migrated from one datacenter (e.g., at site A) to another datacenter (e.g., at site B) through "true" or "false" based on an affinity rule (e.g., based on difference 410 and an application preferred threshold). In one example, VMotion may enable live migration of running virtual machines from one datacenter to another with zero downtime, continuous service availability, and complete transaction integrity. Further, application position 414 may depict a site at which application A is executed upon applying the affinity rule.

For example, consider two sites (e.g., site A and site B) and site A may be considered as a preferred site for application 402. Initially, an administrator may configure site A as the preferred site. Further, application preferred threshold may be defined as 400.

As shown in first row, application 402 may be running in site A as site A is considered as the preferred site. For site A, local count 406 is 1000, remote count 408 is 500, and difference 410 is 500. In this example, difference 410 (i.e., 500) is greater than the application preferred threshold (e.g., 400) and local count 406 (i.e., 1000) is greater than remote count 408 (i.e., 500) and the affinity rule is generated accordingly. Based on the affinity rule, VMotion is "false" as local count 406 (i.e., 1000) is greater than remote count 408 (i.e., 500). Thus, application 402 may continue running in site A.

As shown in second row, application 402 may be still running in site A. For site A, local count 406 is 500, remote count 408 is 1000, and difference 410 is 500. In this example, difference 410 (i.e., 500) is greater than the application preferred threshold (e.g., 400) and the affinity rule may be generated accordingly. Based on the affinity rule, VMotion is "true" as remote count 408 (i.e., 1000) is greater than local count 406 (i.e., 500). Thus, application 402 may be migrated from site A to site B.

Similarly, as shown in third row, application 402 may be running in site B. For site B, local count 406 is 600, remote count 408 is 1000, and difference 410 is 400. In this example, difference 410 (i.e., 400) is equal to the application preferred threshold (e.g., 400) and the affinity rule may be generated accordingly. Based on the affinity rule, VMotion is "true" as remote count 408 (i.e., 1000) is greater than local count 406 (i.e., 600). Thus, application 402 may be migrated from site B to site A. Thus, the virtual machine can be dynamically migrated between the sites based on the demand for application 402 at different times.

Figure 5:
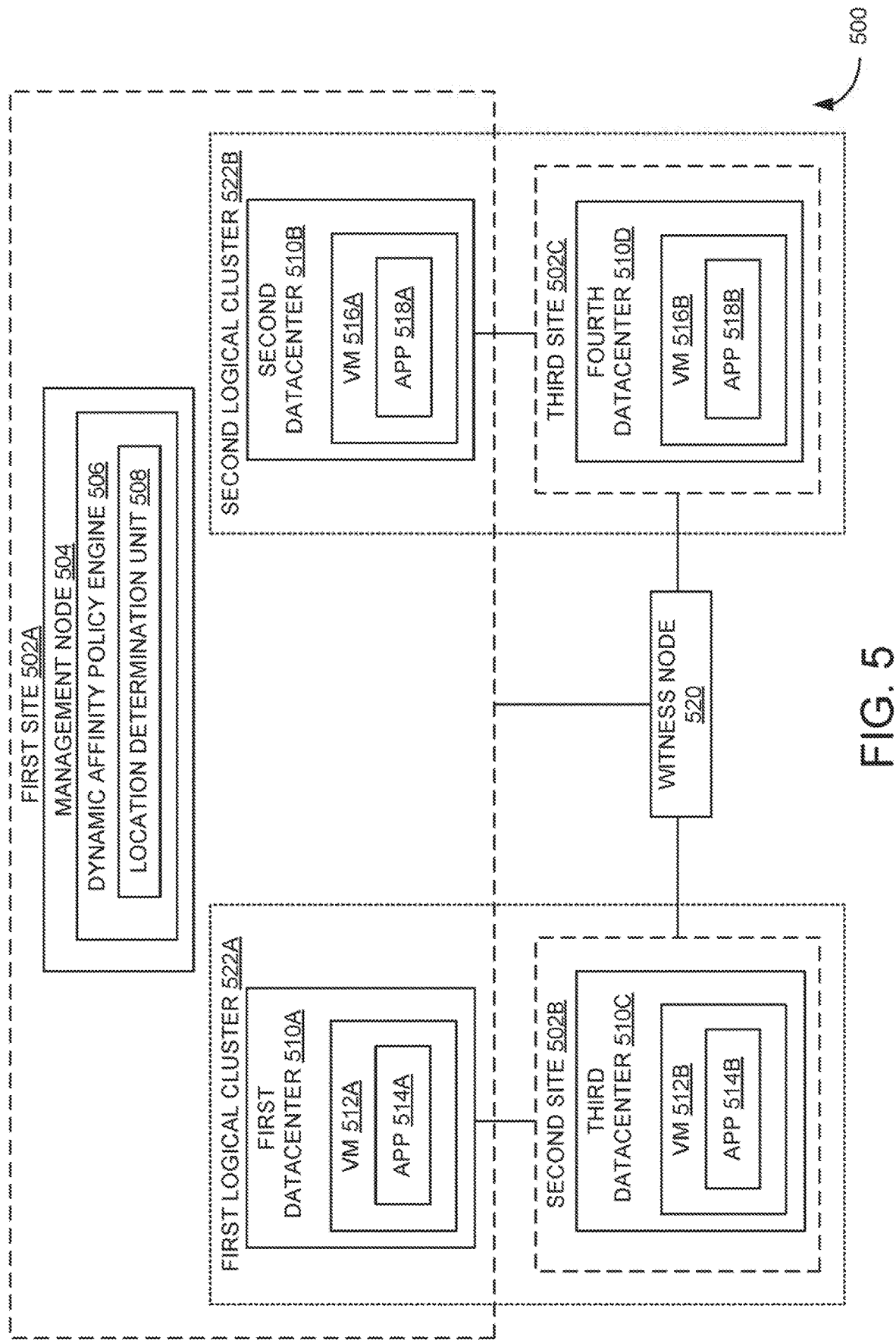
FIG. 5 is a block diagram of an example system illustrating migration of a virtual machine in a logical cluster.

FIG. 5 is a block diagram of an example system 500 illustrating migration of a virtual machine (e.g., 512A and 516A) in a logical cluster (e.g., a first logical cluster 522A and a second logical cluster 522B). Examples described herein may be implemented in VMware Fleet Management or Robo Architecture as shown in FIG. 5. In one example, the Fleet Management may include Robo Architecture having a central office and multiple branch offices. As shown in FIG. 5, there are three sites. A first site 502A may represent the central office. A second site 502B and a third site 502C may represent branch offices.

Further, first site 502A (i.e., central office) may include a management node 504 to control the branch offices at second site 502B and third site 502C. Further, first site 502A, second site 502B, and third site 502C may include corresponding datacenters (e.g., software-defined datacenters). First site 502A may include a first datacenter 510A and a second datacenter 510B. Second site 502B may include a third datacenter 510C and third site 502C may include a fourth datacenter 510D.

Furthermore, first logical cluster 522A may be vSAN stretched cluster between first datacenter 510A and third datacenter 510C of the central office (i.e., first site 502A) and a first branch office (i.e., second site 502B), respectively. Similarly, second logical cluster 522B may be vSAN stretched cluster between second datacenter 510B and fourth datacenter 510D of the central office (i.e., first site 502A) and a second branch office (i.e., third site 502C).

As shown in FIG. 5, system 500 may include a witness node 520. In one example, witness node 520 may be located at a different site (e.g., other than first site 502A, second site 502B, and third site 502C) and communicatively connected to first site 502A, second site 502B, and third site 502C. In other examples, a witness node for first logical cluster 522A may be located at third site 502C and a witness node for second logical cluster 522B may be located at second site 502B.

For first logical cluster 522A, second site 502B may be a preferred site for an application 514B running in a virtual machine (VM) 512B. For second logical cluster 522B, third site 502C may be a preferred site for an application 518B running in a virtual machine (VM) 516B. In one example, management node 504 may keep track of user login locations and maintain an application table as described in FIG. 4.

For example, in first logical cluster 522A, application 514B may be running in third datacenter 510C as second site 502B is a preferred site for application 514B. Further, a dynamic affinity policy engine 506 may dynamically determine a real-time affinity rule based on number of users in second site 502B and first site 502A accessing application 514B using a location determination unit 508. Based on the affinity rule, management node 504 may migrate VM 512B to first datacenter 510A. Thus, a VM 512A may start executing application 514A and vice versa, where application 514A and 514B may be same application, VM 512A and VM 512B may perform same functionalities.

Similarly, in second logical cluster 522B, application 518B may be running in fourth datacenter 510D as third site 502C is a preferred site for application 518B. Further, dynamic affinity policy engine 506 may dynamically determine a real-time affinity rule based on number of users in third site 502C and first site 502A accessing application 518B using location determination unit 508. Based on the affinity rule, management node 504 may migrate VM 516B to second datacenter 510B. Thus, a VM 516A may start executing application 518A and vice versa, where application 518A and 518B may be same application, one being a master application and other being a replica application. Further, VM 516A and VM 516B may perform same functionalities, one being a master or active virtual machine, and other being a replica virtual machine.

Example Processes

Figure 6:
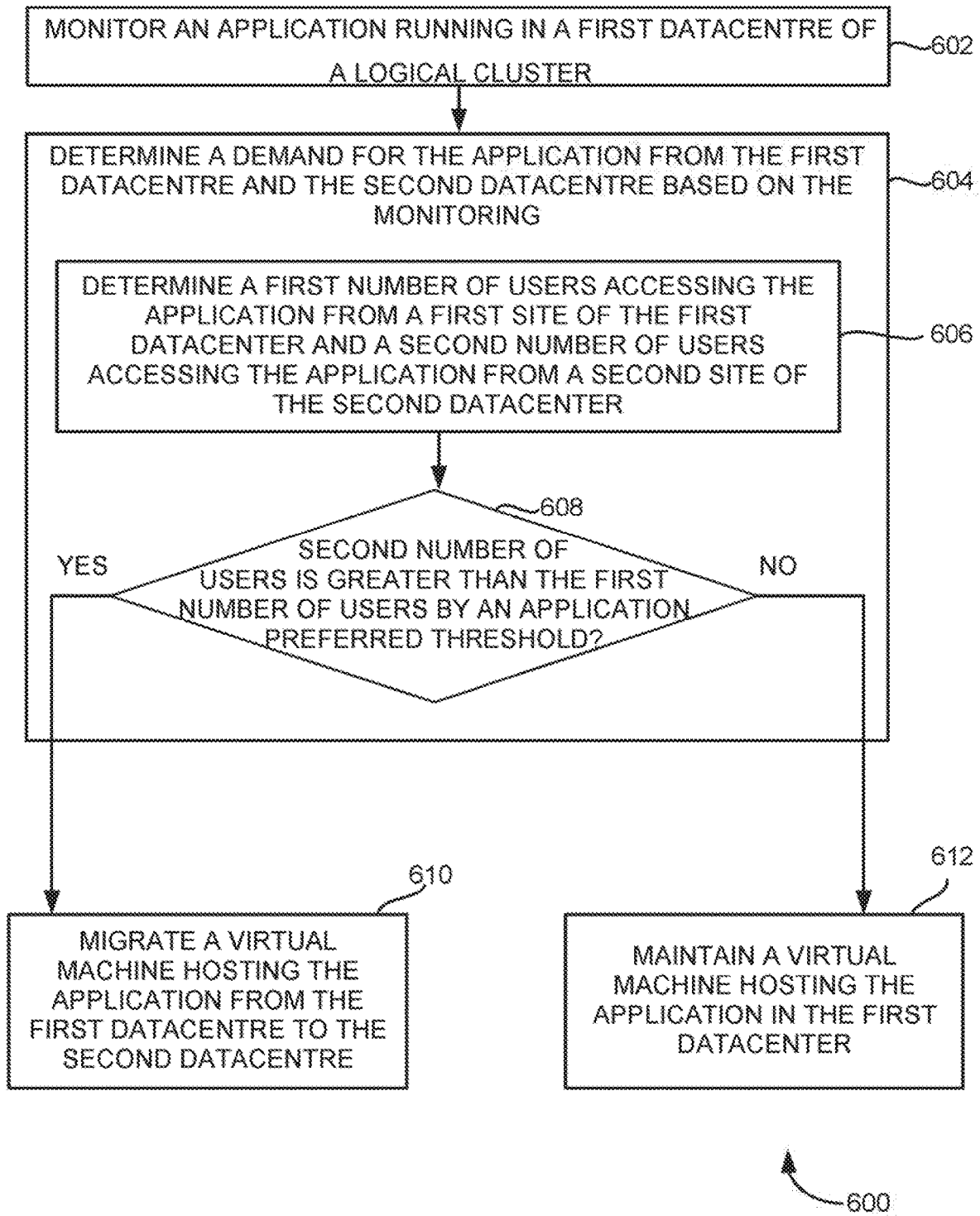
FIG. 6 is an example flow diagram illustrating recommending migration of a virtual machine hosting an application from a first datacenter to a second datacenter based on a demand for the application.

FIG. 6 is an example flow diagram 600 illustrating recommending migration of a virtual machine hosting an application from a first datacenter to a second datacenter based on a demand for the application. It should be understood that the process depicted in FIG. 6 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 602, an application running in a first datacenter of a logical cluster may be monitored. In one example, the logical cluster may span across the first datacenter and a second datacenter. For example, the first datacenter and the second datacenter may be located at different sites. Example second datacenter may include a copy of data associated with the virtual machine that hosts the application in the first datacenter. In one example, the logical cluster may be a virtual storage area network (vSAN) stretched cluster. The vSAN stretched cluster may include the first datacenter located at a first site that is configured as a first fault domain and the second datacenter located at a second site that is configured as a second fault domain.

At 604, a demand for the application from the first datacenter and the second datacenter may be determined based on the monitoring. In one example, the demand for the application from the first datacenter and the second datacenter may be determined by determining a first number of users accessing the application from a first location of the first datacenter and a second number of users accessing the application from a second location of the second datacenter, at 606. In one example, the first number of users and the second number of users accessing the application from the first location and the second location, respectively, may be determined using a location determination mechanism.

At 608, a check may be made to determine whether the second number of users is greater than the first number of users by an application preferred threshold. In one example, application preferred threshold may be set for the application by an administrator. In another example, the application preferred threshold may be dynamically determined for the application using a machine learning algorithm.

At 610, a virtual machine hosting the application may be migrated from the first datacenter to the second datacenter based on the demand for the application. In one example, the virtual machine hosting the application may be migrated from the first datacenter to the second datacenter when the second number of users is greater than or equal to the first number of users by the application preferred threshold. For example, migrating the virtual machine hosting the application from the first datacenter to the second datacenter may include dynamically generating an affinity rule based on the demand for the application from the first datacenter and the second datacenter and migrating the application from the first datacenter to the second datacenter in accordance with the affinity rule.

At 612, the virtual machine hosting the application may be maintained in the first datacenter when the second number of users is less than the first number of users by the application preferred threshold.

Figure 7:
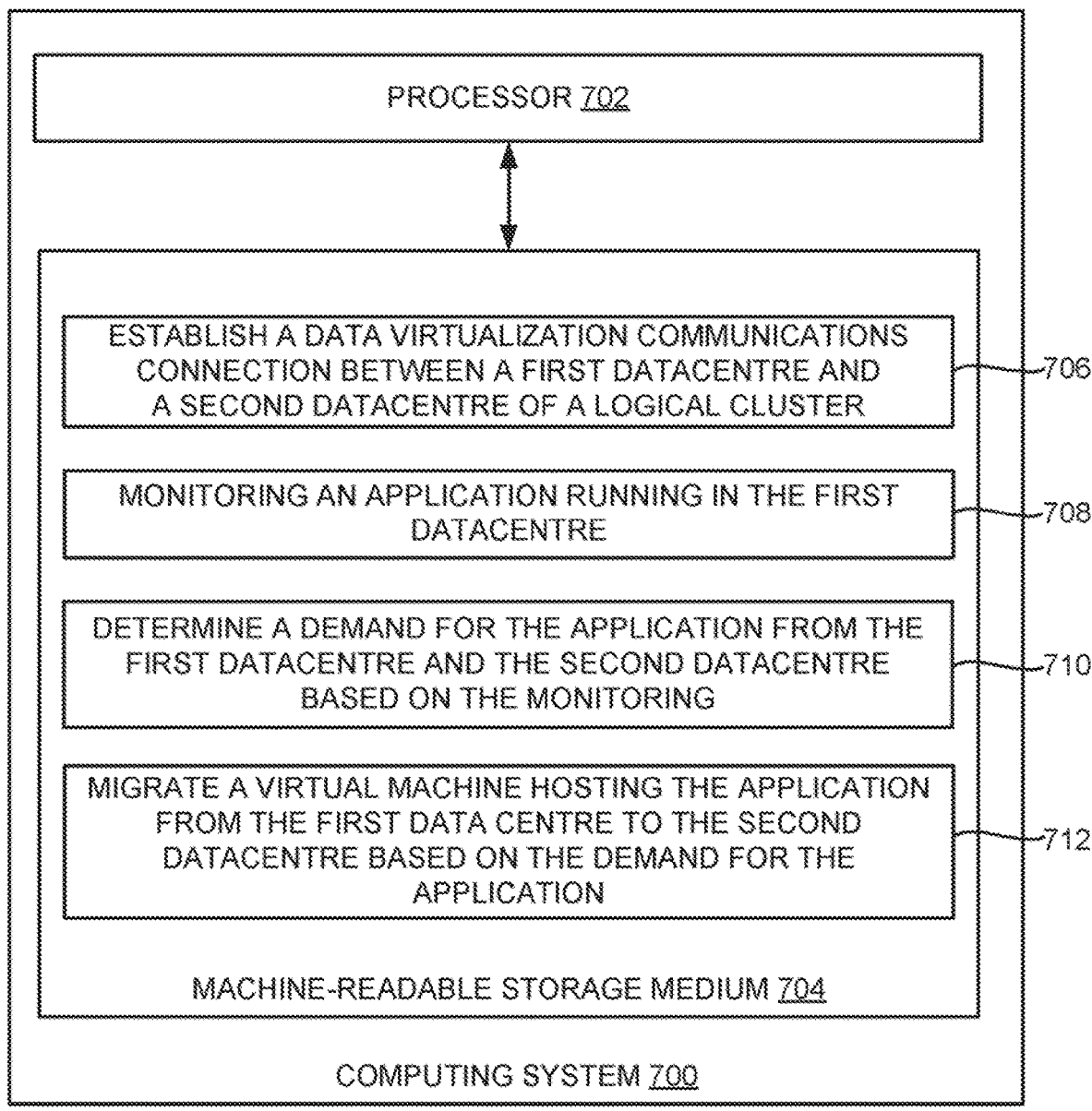
FIG. 7 is a block diagram of an example computing system including a non-transitory computer-readable storage medium, storing instructions to recommend migration of a virtual machine hosting an application from a first datacenter to a second datacenter based on a demand for the application.

FIG. 7 is a block diagram of an example computing system 700 including a non-transitory computer-readable storage medium 704, storing instructions to recommend migration of a virtual machine hosting an application from a first datacenter to a second datacenter based on a demand for the application. Computing system 700 may include a processor 702 and machine-readable storage medium 704 communicatively coupled through a system bus. Processor 702 may be any type of central processing unit (CPU), microprocessor, or processing logic that interprets and executes machine-readable instructions stored in the machine-readable storage medium 704. Machine-readable storage medium 704 may be a random-access memory (RAM) or another type of dynamic storage device that may store information and machine-readable instructions that may be executed by processor 702. For example, machine-readable storage medium 704 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 704 may be a non-transitory machine-readable medium. In an example, machine-readable storage medium 704 may be remote but accessible to computing system 700.

Machine-readable storage medium 704 may store instructions 706-712. In an example, instructions 706-712 may be executed by processor 702 for recommending migration of the virtual machine hosting the application from the first datacenter to the second datacenter based on the demand for the application. Instructions 706 may be executed by processor 702 to establish a data virtualization communications connection between the first datacenter and the second datacenter of a logical cluster. In one example, the second datacenter may be a copy of the first datacenter. Instructions 708 may be executed by processor 702 to monitor the application running in the first datacenter. Instructions 710 may be executed by processor 702 to determine a demand for the application from the first datacenter and the second datacenter based on the monitoring. Further, instructions 712 may be executed by processor 702 to migrate a virtual machine hosting the application from the first datacenter to the second datacenter based on the demand for the application. In one example, the instructions to migrate the virtual machine hosting the application from the first datacenter to the second datacenter may include instructions to dynamically generate an affinity rule based on the demand for the application from the first datacenter and the second datacenter and migrate the application from the first datacenter to the second datacenter in accordance with the affinity rule.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A system comprising:
    a logical cluster including:
        a first datacenter located at a first site and includes a virtual machine executing an application;
        a second datacenter located at a second site, the second datacenter being a replication of the first datacenter; and
        a management node communicatively coupled to the first datacenter and the second datacenter, wherein the management node comprises a processor and memory coupled to the processor, and wherein the memory comprises a dynamic affinity policy engine to:
            monitor the application running in the first datacenter;
            determine a demand for the application from the first datacenter and the second datacenter based on the monitoring, wherein, to determine the demand for the application, the dynamic affinity policy engine is to:
                determine a first number of users accessing the application from the first site of the first datacenter; and
                determine a second number of users accessing the application from the second site of the second datacenter;
            determine that the second number of users is greater than the first number of users by an application preferred threshold; and
            migrate the virtual machine hosting the application from the first datacenter to the second datacenter when the second number of users is greater than the first number of users by the application preferred threshold.

2. The system of claim 1, wherein the dynamic affinity policy engine is to:
    dynamically generate an affinity rule based on the demand for the application from the first datacenter and the second datacenter; and
    transmit the affinity rule to a management application, wherein the management application is to apply the affinity rule to migrate the virtual machine hosting the application from the first datacenter to the second datacenter.

3. The system of claim 1, wherein the dynamic affinity policy engine is to:
    dynamically generate an affinity rule when the second number of users is greater than the first number of users by the application preferred threshold; and recommend migrating the virtual machine hosting the application from the first datacenter to the second datacenter via transmitting the affinity rule to a management application.

4. The system of claim 1, wherein the application preferred threshold is set for the application by an administrator.

5. The system of claim 1, wherein the application preferred threshold is dynamically determined for the application using a machine learning algorithm.

6. The system of claim 3, wherein the dynamic affinity policy engine is to:
maintain and dynamically update an application table to include the first number of users accessing the application from the first site, the second number of users accessing the application from the second site, and the affinity rule.

7. The system of claim 3, wherein the dynamic affinity policy engine further comprises:
a location determination unit to determine that the first number of users and the second number of users are accessing the application from the first site and the second site, respectively.

8. The system of claim 1, wherein the logical cluster further comprises:
a witness node located at a third site and connected to the first datacenter and the second datacenter, wherein the witness node comprises a processor and memory coupled to the processor, and wherein the memory comprises instructions that enable the witness node to serve as a tiebreaker for a split-brain scenario and store witness components associated with the application.

9. A method comprising:
monitoring an application running in a first datacenter of a logical cluster, wherein the logical cluster spans across the first datacenter and a second datacenter;
determining a demand for the application from the first datacenter and the second datacenter based on the monitoring, wherein determining the demand for the application from the first datacenter and the second datacenter, comprises:
determining a first number of users accessing the application from a first location of the first datacenter; and
determining a second number of users accessing the application from a second location of the second datacenter;
determining that the second number of users is greater than the first number of users by an application preferred threshold; and
migrating a virtual machine hosting the application from the first datacenter to the second datacenter when the second number of users is greater than the first number of users by the application preferred threshold.

10. The method of claim 9, wherein the application preferred threshold is set for the application by an administrator.

11. The method of claim 9, wherein the application preferred threshold is dynamically determined for the application using a machine learning algorithm.

12. The method of claim 9, wherein the first number of users and the second number of users accessing the application from the first location and the second location, respectively, are determined using a location determination mechanism.

13. The method of claim 9, wherein the first datacenter and the second datacenter are located at different sites, and wherein the second datacenter comprises a copy of data associated with the virtual machine that hosts the application in the first datacenter.

14. The method of claim 9, wherein migrating the virtual machine hosting the application from the first datacenter to the second datacenter comprises:
dynamically generating an affinity rule based on the demand for the application from the first datacenter and the second datacenter, and
migrating the application from the first datacenter to the second datacenter in accordance with the affinity rule.

15. The method of claim 9, wherein the logical cluster is a virtual storage area network (vSAN) stretched cluster, and wherein the vSAN stretched cluster comprises the first datacenter located at a first site that is configured as a first fault domain and the second datacenter located at a second site that is configured as a second fault domain.

16. A non-transitory computer readable storage medium having instructions that when executed by a processor, cause the processor to:
establish a data virtualization communications connection between a first datacenter and a second datacenter of a logical cluster, the second datacenter being a copy of the first datacenter;
monitor an application running in the first datacenter;
determine a demand for the application from the first datacenter and the second datacenter based on the monitoring, wherein the instructions to determine the demand for the application from the first datacenter and the second datacenter comprises instructions to:
determine a first number of users accessing the application from a first location the first datacenter; and
determine a second number of users accessing the application from a second location of the second datacenter;
determine that the second number of users is greater than the first number of users by an application preferred threshold; and
migrate a virtual machine hosting the application from the first datacenter to the second datacenter when the second number of users is greater than the first number of users by the application preferred threshold.

17. The non-transitory computer readable storage medium of claim 16, wherein the instructions to migrate the virtual machine hosting the application from the first datacenter to the second datacenter comprises instructions to:
dynamically generate an affinity rule based on the demand for the application from the first datacenter and the second datacenter; and
migrate the application from the first datacenter to the second datacenter accordance with the affinity rule.

* * * * *